Oct. 15, 1963 C. H. KEITH 3,107,042

COLLAPSIBLE CARTON

Filed Jan. 10, 1961 5 Sheets-Sheet 1

INVENTOR

Clifford H. Keith,

BY Irwin V. Glenn

ATTORNEY

Oct. 15, 1963 C. H. KEITH 3,107,042

COLLAPSIBLE CARTON

Filed Jan. 10, 1961 5 Sheets-Sheet 2

INVENTOR
Clifford H. Keith,

BY Irvin V. Gleim
ATTORNEY

INVENTOR
Clifford H. Keith,
BY Irwin V. Glein
ATTORNEY

Oct. 15, 1963 C. H. KEITH 3,107,042

COLLAPSIBLE CARTON

Filed Jan. 10, 1961 5 Sheets-Sheet 4

INVENTOR

Clifford H. Keith,

BY Irwin V. Glein

ATTORNEY

Oct. 15, 1963 C. H. KEITH 3,107,042

COLLAPSIBLE CARTON

Filed Jan. 10, 1961 5 Sheets-Sheet 5

INVENTOR

Clifford H. Keith,

BY Irwin V. Glein

ATTORNEY 3,107,042
Patented Oct. 15, 1963

3,107,042

COLLAPSIBLE CARTON

Clifford H. Keith, Cincinnati, Ohio, assignor to The Mead Corporation, Dayton, Ohio, a corporation of Ohio Filed Jan. 10, 1961, Ser. No. 81,865
4 Claims. (Cl. 229—41)

The present invention relates to a collapsible carton and more particularly, to a collapsible carton formed from a single blank of corrugated cardboard or equivalent material die cut and creased to define five rows of horizontally aligned edge-joined panels, the middle set of which are joined at their free edges to define a circumferentially continuous carton liner, the upper and lower rows being folded to the outside and then likewise joined at their free edges to define continuous outer carton portions telescopically engageable over the top and bottom ends of the carton liner, and the intermediate rows being notched and creased so as to automatically interleave to form the top and bottom closures as the carton parts are telescoped together.

Specifically, there is provided a single die cut blank of corrugated cardboard or similar relatively stiff but bendable material. The blank has a central row of edge-joined panels, the free edges of the end panels of which are joined to each other as by the use of a strip of adhesive tape to define a circumferentially continuous carton inner wall or liner. The blank also has a top and bottom row of panels folded to the outer side of the carton and similarly joined at their free edges to define continuous bands telescopically slidable over the upper and lower ends of the liner portion. Between the said upper and central and again between the central and lower rows of panels, which define the double thickness walls of the carton, there is a row of closure forming panels each of which is centrally and horizontally creased so as to be foldable upon itself and is cut away along the edge of one or both halves thereof to define a notch into which the folded edge of an adjacent panel may extend as said closure forming panels fold inwardly and interleavingly to automatically form multiply top and bottom closures of the carton as the wall portions thereof are telescoped together, or to open the same on a reverse movement of the parts.

It is accordingly an object of the invention to provide a single blank carton having telescopically mating inner and outer walls and top and bottom closures automatically closed or opened by the relative telescopic movements of the carton walls.

It is another object to provide a carton of this type which can be collapsed into a flat package for shipping or storage either before or after use as a carton.

It is another object to provide a device of the character described in which all of the blank material initially encompassed within its margins is utilized to provide multiple walls for the carton sides and closure.

It is a further object of the invention to provide a collapsible carton which is simple in construction, inexpensive to manufacture and yet effective and efficient in use.

Other and further objects of the invention will become apparent from a reading of the following specification taken in conjunction with the drawings, in which.

Figure 3:
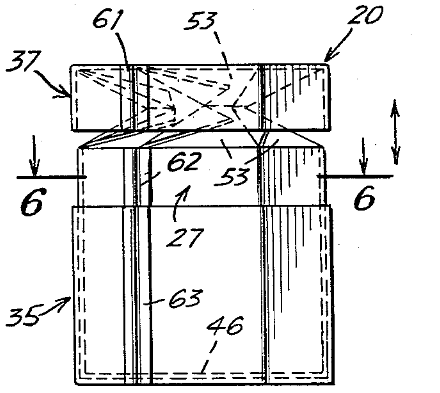
FIGURE 3 is an elevational view of the carton of FIGURE 1, illustrating the beginning of the top opening operation.
Figure 1:
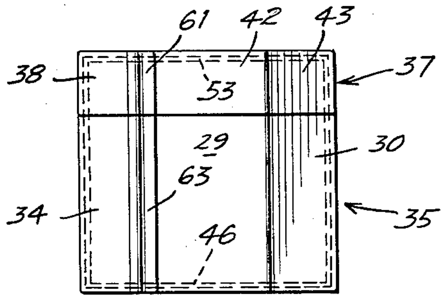
FIGURE 1 is a side elevational view of a closed carton embodying the invention.

With reference now of FIGURES 1 through 14 of the drawings, numeral 20 generally designates the die cut rectangular blank. Blank 20 may be cut from any suitable sheet material such as corrugated cardboard. A central transversely extending row of rectangular panels 21 through 26 defines the inner or liner portion of the two ply carton, said liner being generally designated by numeral 27. The panels 21 through 26 are defined by the hinge score lines at 28.

A second row of panels 29 through 34 is collectively designated by the numeral 35. The panels of row 35 are similarly hingedly connected and defined by score lines 36. The row of panels 35 constitutes the lower portion of the telescopic outer members of the completed carton.

The upper portion of the outside carton walls is formed by a row 37 consisting of panels 38 through 43 similarly joined by score lines 44.

Figure 7:
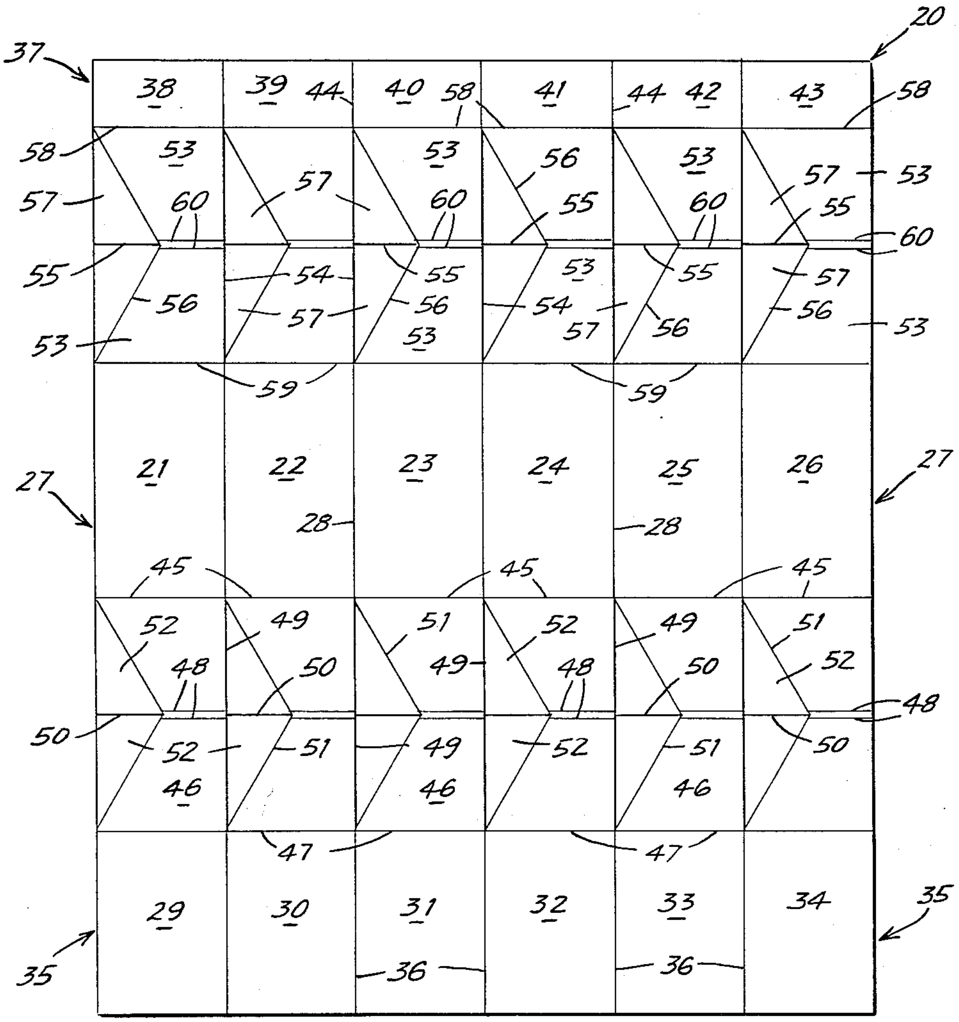
FIGURE 7 is a plan view of the die cut blank prior to any folding operations.
Figure 6:
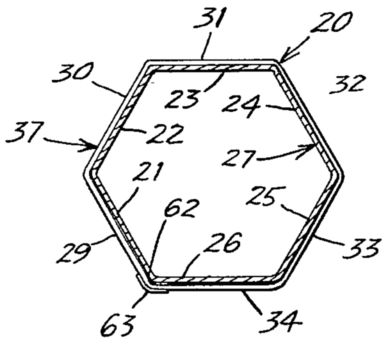
FIGURE 6 is a plan view of the carton in section taken on the line 6—6 of FIGURE 3.

As best seen in FIGURE 7 each of the panels 21 through 26 is joined at its lower edge along fold lines 45 to the upper end of one of the identical panels 46 which form the bottom closure of the carton in a manner hereinafter fully described.

The panels 46 are likewise connected at their lower ends to the upper edges of panels 39 through 34 at the scored hinge lines at 47.

Each panel 46 has impressed therein a double score line 48 horizontally and medially disposed in the right half of each panel 46. Each panel 46 is separated from adjacent panel 46 by a die cut slit 49. Each panel 46 is further provided with a slit 50 and with a pair of score lines 51, which together define the flaps 52, the purpose of which will hereinafter be more fully described.

The liner panels 21 through 36 are similarly connected to the upper outside panels 38 through 43 by a series of identical panels 53 which, except for their location, are substantially identical with the closure panels 46 described above. Panels 53 are severed from each other by the severance lines 54, and are slit medially at 55 to define in cooperation with score lines 56, the flaps 57. Like panels 46 previously described, the closure panels 53 are hingedly connected at their upper and lower ends respectively to the panels of row 37 and row 27 at score lines 58 and 59. Double score lines 60 divide the panels 53 into lower and upper halves foldable onto each other about score lines 60.

Figure 8:
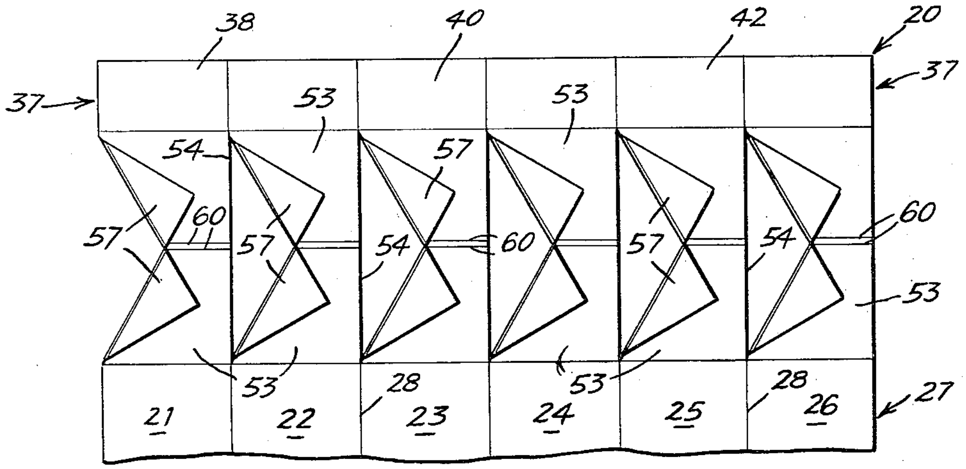
FIGURE 8 is a fragmentary plan view of the upper half of the showing of FIGURE 7, illustrating the folding operations producing the interleaving closure elements.
Figure 9:
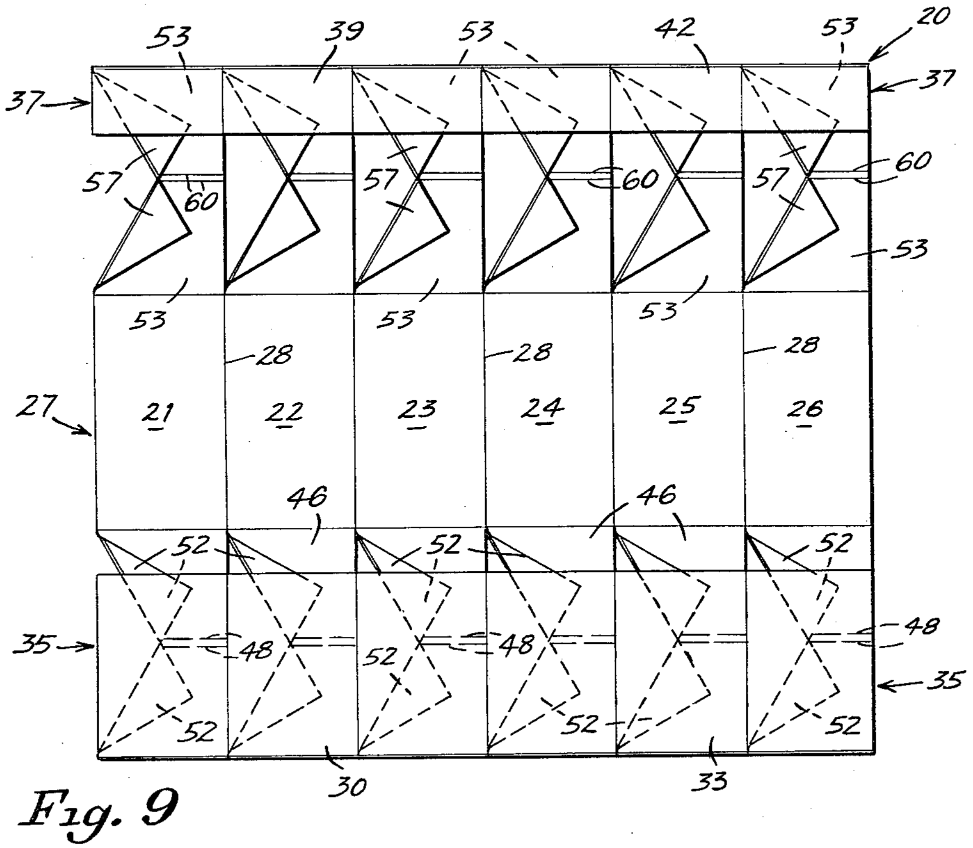
FIGURE 9 is a plan view of the blank immediately prior to folding into its tubular condition.
Figure 13:
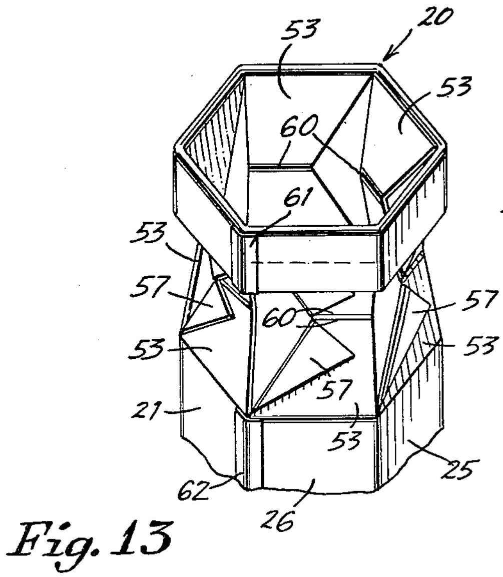
FIGURE 13 is a fragmentary, perspective view showing the beginning of the infolding operation that closes the upper closure member.
Figure 14:
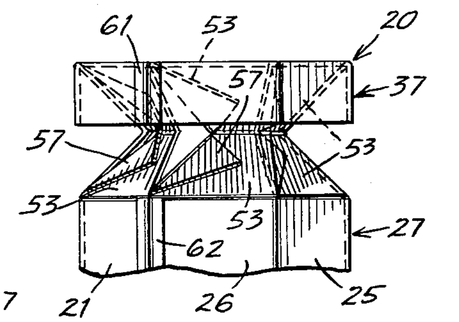
FIGURE 14 is a fragmentary elevational view showing the upper closure member more nearly closed.
Figure 15:
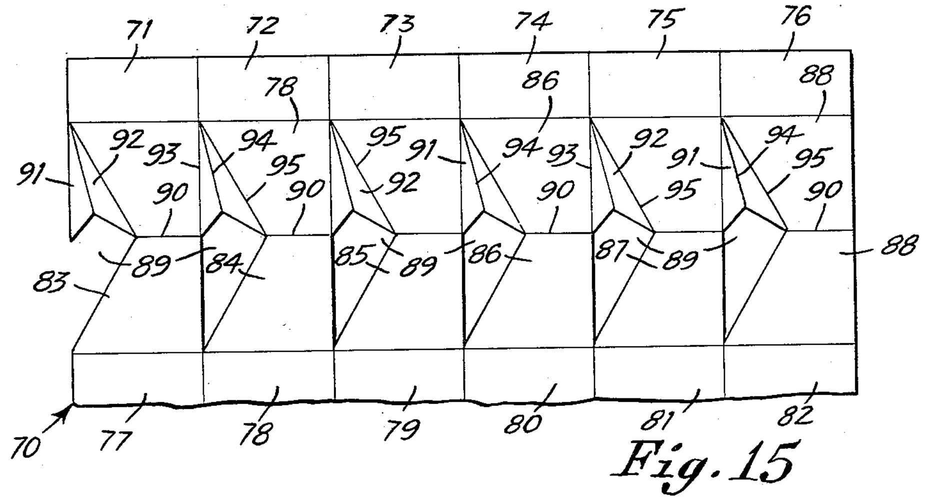
FIGURE 15 is a fragmentary plan view of a blank for a modified form of the carton.
Figure 16:
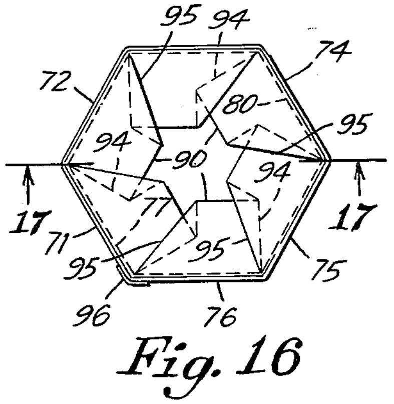
FIGURE 16 is a plan view of the partially closed carton formed by the blank of FIGURE 15.
Figure 17:
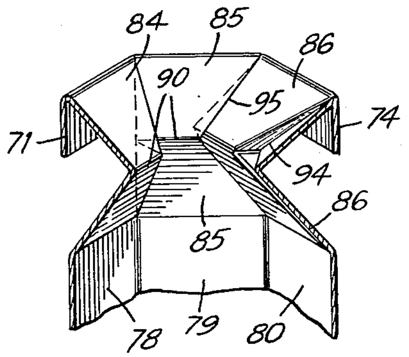
FIGURE 17 is a fragmentary elevational view of the showing of FIGURE 16, in section and taken on line 17—17 of FIGURE 16; and, FIGURE 18 is a plan view similar to FIGURE 16 but showing the carton fully closed.

FIGURES 8 and 9 illustrate the next step of folding flaps 52 and 57 against the inside surfaces of the folding closure panels 46 and 53, respectively, in which positions they are firmly retained by the application of adhesive to the engaging surfaces thereof.

Figure 10:
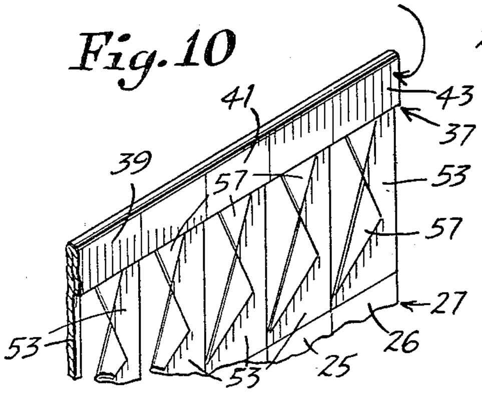
FIGURE 10 is a fragmentary perspective view of the upper right portion of FIGURE 9.

FIGURES 9 and 10 show the next step of folding the outside panel rows 37 and 35, respectively, down over the upper portion of panels 53 and upwardly over the bottom portion of closure panels 46.

Figures 4, 5:
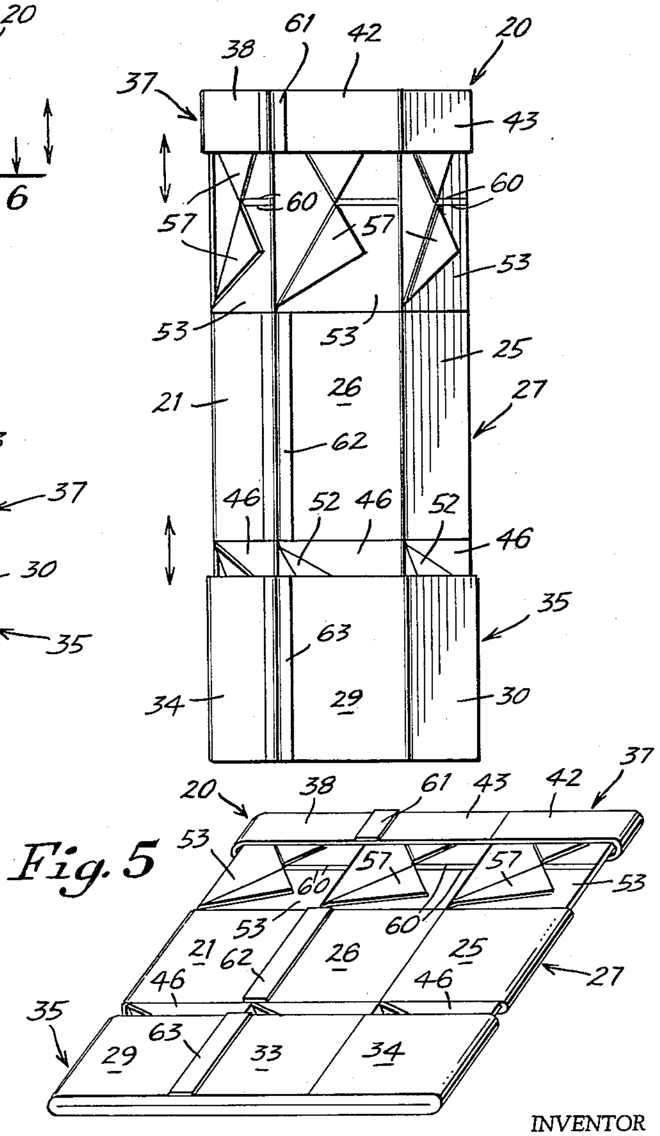
FIGURE 4 is a side elevational view of the carton fully open at both top and bottom.
FIGURE 5 is a perspective view of the opened carton of FIGURE 4 collapsed into a flat package.
Figure 2:
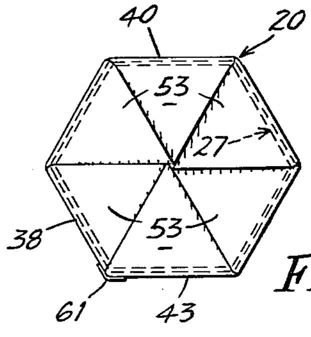
FIGURE 2 is a plan view of the carton of FIGURE 1.

The final assembly step is indicated in FIGURE 5 in which the free ends of rows 37, 27 and 35, respectively, are joined together by strips of adhesive tape 61, 62 and 63. The strips of adhesive tape 61, 62 and 63 hingedly connect the adjacent edges of the panel rows aforesaid.

Figure 12:
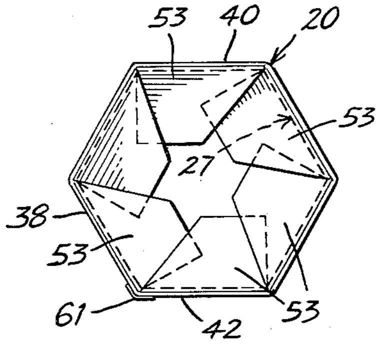
FIGURE 12 is a plan view showing the upper closure structure partially closed.
Figure 11:
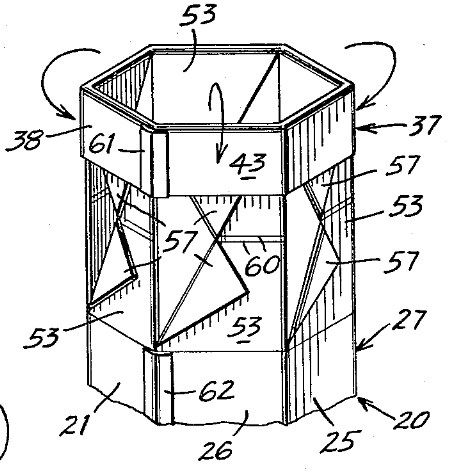
FIGURE 11 is a perspective view of the upper end of the assembled carton.

To erect the box, the same is positioned as shown in FIGURE 4, standing on the row of panels 35 as a base. Downward pressure on the upper edge of panel row 37 initiates the inward bowing of the rows of closure panels 53 and 46 as shown in FIGURES 3, 12, 13 and 14. Further downward movement of panel row 37 (now defining a hexagon in plan view) causes the interleaving of the closure panels, as shown in FIGURE 12 to progress toward the closure panel arrangement of FIGURE 2, and further initiates the telescoping of outside carton portions 37 and 35 over the liner portion 27 to bring the parts of the carton first into the nearly closed condition of FIGURE 3 and finally into the fully closed condition of FIGURE 1.

Because of the greater vertical dimension of panel row 35 as compared to panel row 37, the frictional interengagement between panel row 35 and the liner 27 will be greater than between liner 27 and panel row 37. Thus, an upwardly exerted pull on the portion 37 will tend to cause an opening of the upper closure formed by panels 53 before the liner 27 will begin to slide from the lower outside carton portion 35. Only when it is desired to re-collapse the carton back to its condition of FIGURE 5 for storage, will the liner 27 be withdrawn from the lower carton portion 35.

In the species of FIGURES 15 through 18, the numeral 70 generally designates the die cut rectangular blank. Blank 70 has the same basic construction and arrangement of parts described in the species of FIGURES 1 through 14, and, therefore, only the portions thereof containing the structural differences have been illustrated in FIGURES 15 through 18.

The row of edge-joined panels 71–76 form the upper outer carton wall portions and correspond to telescopic part 37 of the first-described species. The row of edge-joined panels 77–82 (corresponding to panels 21–26) constitute the inner wall or liner of this carton.

Blank 70 differs from blank 20 essentially in the configurations of closure forming panels 83–88, which interleave to form the upper closure. The (lower closure, not shown, is of similar construction.) However, the panels 83–88 are only laterally disconnected from their adjacent panels for half of their lengths by the cut out areas designated 89. These areas receive the edges of panels 83–88 when they fold about their scored midlines 90. The upper portions of the panels 83–88 are laterally joined by the integral webs 91 and 92 defined by the scored fold lines 93, 94 and 95, which render the webs sufficiently flexible to insure proper interleaving of the closure forming panels 83–88. The webs 91 and 92 perform the important function of providing a seal between the adjacent upper edges of closure panels 83–88 to prevent leakage into or from the carton between the overlapped panel portions. The free edges of panel rows 77–82 and 83–88 are joined (as by adhesive tape 96) to form circumferentially continuous paneled bands, as in the first-described species.

Figure 18:
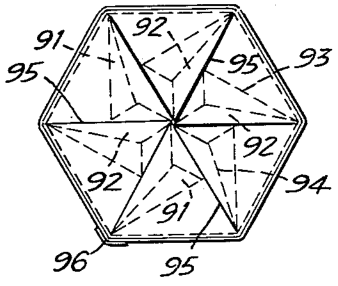

As panels 77–82 telescope down over panels 83–88 (FIGURES 16 and 17), the webs 91 and 92 first fold toward each other about fold lines 94 to permit initiation of the interleaving of panels 83–88, and then as the process continues they unfold into their initial coplanar relationships (as shown in phantom in FIGURE 18).

While the foregoing presents prefered embodiments and methods of the present invention, it is obvious that other modifications and/or equivalents may be employed without departing from the scope of the invention, which is defined in the appended claims.

What is claimed is:

1. A device of the character described, comprising a plurality of edge-joined panels defining a circumferentially continuous inner wall of a carton, a like number of edge-joined panels defining the lower portion of the outer wall of said carton, a mating set of edge-joined panels defining the upper portion of the outer wall of said carton, sets of laterally disconnected panels joining the top and bottom edges of said inner wall panels respectively to the top and bottom edges of the panels defining the upper and the lower outer wall portions, each of said laterally disconnected panels having a horizontal medial fold crease formed therein and being provided with a shallow V-shaped notch in one side thereof whereby said latter panels will fold inwardly with each receiving the medially folded edge of an adjacent panel within the crotch of the V-shaped notch thereof to provide a sequential interleaving of said sets of laterally disconnected panels to define top and bottom closures for said carton as said upper and lower outer wall portions are telescoped axially over the upper and lower ends of said carton inner wall, and flexible means connecting the adjacent edges of said edge-joined panels whereby said carton can be collapsed into a flat package for shipping or storage when the parts thereof are fully axially extended, said flexible means being integral portions of said edge-joined panels made more flexible than said panels by score lines defining said flexible means, said carton being formed of a single die cut blank, the upper and lower edge-joined panels of which are folded to the outside thereof after which said blank is formed into a tubular configuration by joining the free edges of each set of edge-joined panels, said panels defining the lower portion of the carton outer wall being considerably greater in vertical dimension than said panels defining the upper portion of the carton outer wall, whereby the latter portion will tend to move more readily relatively to the carton inner wall due to smaller friction producing contact therebetween, so as to open without objectionable movement of said lower outer carton portion relative to the inner carton wall when a carton-opening pull is exerted between said outer wall portions.

2. Structure according to claim 1, said free edges being joined by strips of adhesive coated sheet material.

3. Structure according to claim 1, each of said laterally disconnected panels being formed by centrally slitting the triangular blank portions initially occupying the areas of the shallow V-shaped notch therein and by bending the flaps so defined back onto the said laterally disconnected panel and adhering said flaps thereto so as to provide panel-reinforcing double thickness of blank material and a smooth folded edge respectively adjacent and at the margins of said notch.

4. Structure according to claim 1, said blank, for economy of manufacture, having the surface thereof providing the telescopically engaging and normally concealed surfaces of said carton, provided with a less expensive finish than the other surface of the blank providing the inner and outer surfaces of said carton.

References Cited in the file of this patent

UNITED STATES PATENTS

| | | |
|---|---|---|
| 2,013,691 | Martinson | Sept. 10, 1935 |
| 2,091,291 | Ringler | Aug. 31, 1937 |
| 2,577,588 | Paige | Dec. 4, 1951 |